US012164986B2

United States Patent
Agrawal et al.

(10) Patent No.: US 12,164,986 B2
(45) Date of Patent: Dec. 10, 2024

(54) MODIFYING A BARCODE DISPLAY TO FACILITATE BARCODE SCANNING

(71) Applicant: Motorola Mobility LLC, Chicago, IL (US)

(72) Inventors: Amit Kumar Agrawal, Bangalore (IN); Satyabrata Rout, Bangalore (IN); Himanshu Chug, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/131,066

(22) Filed: Apr. 5, 2023

(65) Prior Publication Data

US 2024/0338544 A1    Oct. 10, 2024

(51) Int. Cl.
*G06K 19/06*  (2006.01)
*G06K 7/14*  (2006.01)

(52) U.S. Cl.
CPC ...... *G06K 19/06112* (2013.01); *G06K 7/1417* (2013.01)

(58) Field of Classification Search
CPC .............. G06K 19/06112; G06K 7/1417
See application file for complete search history.

(56) References Cited

U.S. PATENT DOCUMENTS

| | | | |
|---|---|---|---|
| 9,240,056 B2 * | 1/2016 | Hua | G06T 11/00 |
| 9,936,249 B1 * | 4/2018 | Nelson | G06K 19/06037 |
| 2005/0227827 A1 * | 10/2005 | Liester | A63B 21/4043 |
| | | | 482/904 |
| 2013/0140354 A1 * | 6/2013 | Fan | G06K 19/06037 |
| | | | 235/494 |
| 2016/0189016 A1 * | 6/2016 | Windmueller | G06K 19/06037 |
| | | | 235/494 |
| 2017/0337456 A1 * | 11/2017 | Chang | G09G 3/3208 |
| 2022/0036022 A1 * | 2/2022 | Fedtke | G06K 7/10722 |
| 2023/0351137 A1 * | 11/2023 | Hoobler | G06K 7/10821 |

FOREIGN PATENT DOCUMENTS

CA    2698799 A1 * 10/2010    ............. G06F 21/36

OTHER PUBLICATIONS

Rajput, Aditya, "7 best QR Code scanner apps for Android and iOS leading the pack in 2023", Beaconstac Blog [retrieved Mar. 15, 2023]. Retrieved from the Internet <https://blog.beaconstac.com/2019/09/best-qr-code-scanner-apps/>., Jan. 17, 2023, 22 Pages.

* cited by examiner

*Primary Examiner* — Tuyen K Vo
(74) *Attorney, Agent, or Firm* — FIG. 1 Patents

(57) ABSTRACT

Generally, a computing device displays, on a display device of the computing device, a barcode to be read by a scanning device. When a barcode is displayed on the display device a determination is made as to whether the barcode is not fully displayed on the display device due to hardware of the computing device such as a punch hole in the display device for a camera, speaker, or microphone. If the barcode is not fully displayed due to the hardware of the computing device, the display of the barcode is modified so that the barcode is fully displayed on the display device despite the hardware of the computing device. Additionally or alternatively, if the scanning device has not completed the scan within a threshold amount of time, the display of the barcode on the display device is modified, such as by increasing or decreasing the resolution of the barcode.

20 Claims, 7 Drawing Sheets

MODIFYING A BARCODE DISPLAY TO FACILITATE BARCODE SCANNING

BACKGROUND

As technology has advanced our uses for computing devices have expanded. One such use is to transmit information to other devices using a quick response (QR) code. Typically, the user opens an application on his or her computing device and moves the computing device around as needed so that a scanning device can capture the QR code displayed by the computing device. The information in the QR code is then used by the scanning device, such as to allow entry to a facility or to transfer money.

BRIEF DESCRIPTION OF THE DRAWINGS

Embodiments of modifying a barcode display to facilitate barcode scanning are described with reference to the following drawings. The same numbers are used throughout the drawings to reference like features and components.

DETAILED DESCRIPTION

Modifying a barcode display to facilitate barcode scanning is discussed herein. Generally, a computing device displays, on a display device of the computing device, a barcode to be read by a scanning device. Various information can be encoded in the barcode, such as a link (e.g., a uniform resource locator (URL)) for the scanning device to perform a financial transaction corresponding to a payment application on the computing device. In one or more implementations, the computing device includes hardware that may interfere with the display of the barcode, such as a punch hole in the display device for a camera, speaker, or microphone. When a barcode is displayed on the display device a determination is made as to whether the barcode is not fully displayed on the display device due to hardware of the computing device. If the barcode is not fully displayed due to the hardware of the computing device, the display of the barcode is modified so that the barcode is fully displayed on the display device despite the hardware of the computing device. This modification can take any of various forms, such as changing the location on the display device where the barcode is displayed, reducing the resolution of the barcode so the barcode is smaller, and so forth.

Additionally or alternatively, when a barcode is displayed on a display device, a determination is made that the scanning device has not completed the scan within a threshold amount of time. In response to determining that the scanning device has not completed the scan within a threshold amount of time, the display of the barcode on the display device is modified, such as by increasing or decreasing the resolution of the barcode.

Accordingly, the techniques discussed herein modify a barcode display to facilitate reading of the barcode by the scanning device. By modifying the display of the barcode so that hardware of the computing device does not interfere with the barcode, the barcode is fully displayed for the scanning device. By modifying the display of the barcode if the scanning device has not completed the scan within a threshold amount of time, the computing device increases the likelihood of the barcode being displayed in a manner (e.g., at a resolution) that the scanning device can read.

Figure 1:
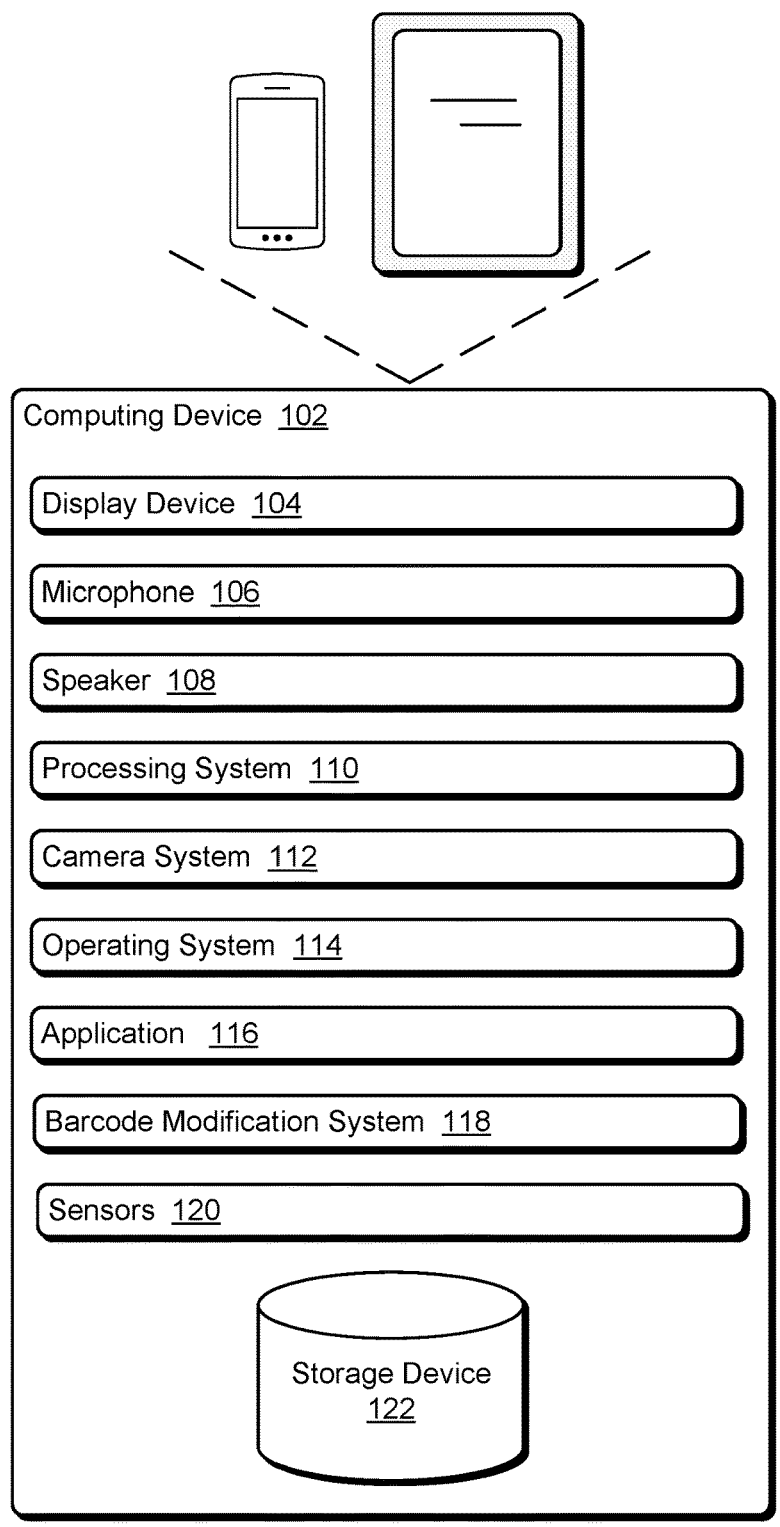
FIG. 1 illustrates an example computing device implementing the techniques discussed herein.

FIG. 1 illustrates an example computing device 102 implementing the techniques discussed herein. The computing device 102 can be, or include, many different types of computing or electronic devices. For example, the computing device 102 can be a smartphone or other wireless phone, a camera (e.g., compact or single-lens reflex), or a tablet or phablet computer. By way of further example, the computing device 102 can be a notebook computer (e.g., netbook or ultrabook), a laptop computer, a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth.

The computing device 102 includes a display device 104, a microphone 106, and a speaker 108. The display device 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display device 104, the microphone 106, and the speaker 108 can be implemented separately from the computing device 102. In such situations, the computing device 102 can communicate with the display device 104, the microphone 106, or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display device 104 may be separate from the computing device 102 and the computing device 102 (e.g., a streaming media player) communicates with the display device 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processing system 110 that includes one or more processors, each of which can include one or more cores. The processing system 110 is coupled with, and may implement functionalities of, any other components or modules of the computing device 102 that are described herein. In one or more embodiments, the processing system 110 includes a single processor having a single core. Alternatively, the processing system 110 includes a single processor having multiple cores or multiple processors (each having one or more cores).

The computing device 102 also includes a camera system 112 that captures images digitally using a sensor implemented using any of a variety of different technologies, such as a charge-coupled device (CCD) sensor, a complementary metal-oxide-semiconductor (CMOS) sensor, combinations thereof, and so forth. The camera system 112 includes one or more sensors and one or more lenses.

Although a single camera system is illustrated in FIG. 1, in one or more implementations multiple camera systems 112 are included in the computing device 102. In such implementations, each of the multiple camera systems 112 includes a single sensor and lens. Additionally or alternatively, one or more of the multiple camera systems may include multiple sensors, multiple lenses, or both multiple sensors and multiple lenses. Each of the multiple camera systems may have a lens positioned in any of a variety of locations in the computing device 102, such as positioned to capture images from the front of the computing device 102 (e.g., the same surface as the display is positioned on) or from the back of the computing device 102. In one or more implementations, each of the multiple camera systems 112 includes a sensor (e.g., CCD or CMOS sensor). Additionally or alternatively, one or more of the multiple camera systems may share a sensor.

The computing device 102 also includes an operating system 114. The operating system 114 manages hardware, software, and firmware resources in the computing device 102. The operating system 114 manages one or more applications 116 running on the computing device 102 and operates as an interface between applications 116 and hardware components of the computing device 102.

The computing device 102 also includes a barcode modification system 118. The barcode modification system 118 modifies a barcode for display on the display device 104. In one or more implementations, a barcode is generated by an application 116 or the operating system 112 and provided to the barcode modification system 118 for display on the display device 104. Additionally or alternatively, the barcode modification system 118 generates the barcode, or the barcode modification system is implemented in the application 116 or the operating system that generated the barcode.

A barcode refers to a label that encodes data and is optically readable by a machine. A barcode can take any of a variety of forms, such as a 1-dimensional barcode or a 2-dimensional barcode. A 2-dimensional barcode may also be referred to as a QR code.

The barcode modification system 118 modifies a barcode for display on the display device 104 in any of a variety of different manners to facilitate scanning of the barcode by another device, also referred to as a scanning device or a scanner. The scanning device may be any of a variety of devices, such as a dedicated barcode reader, another computing device analogous to computing device 102, and so forth.

Figure 2:
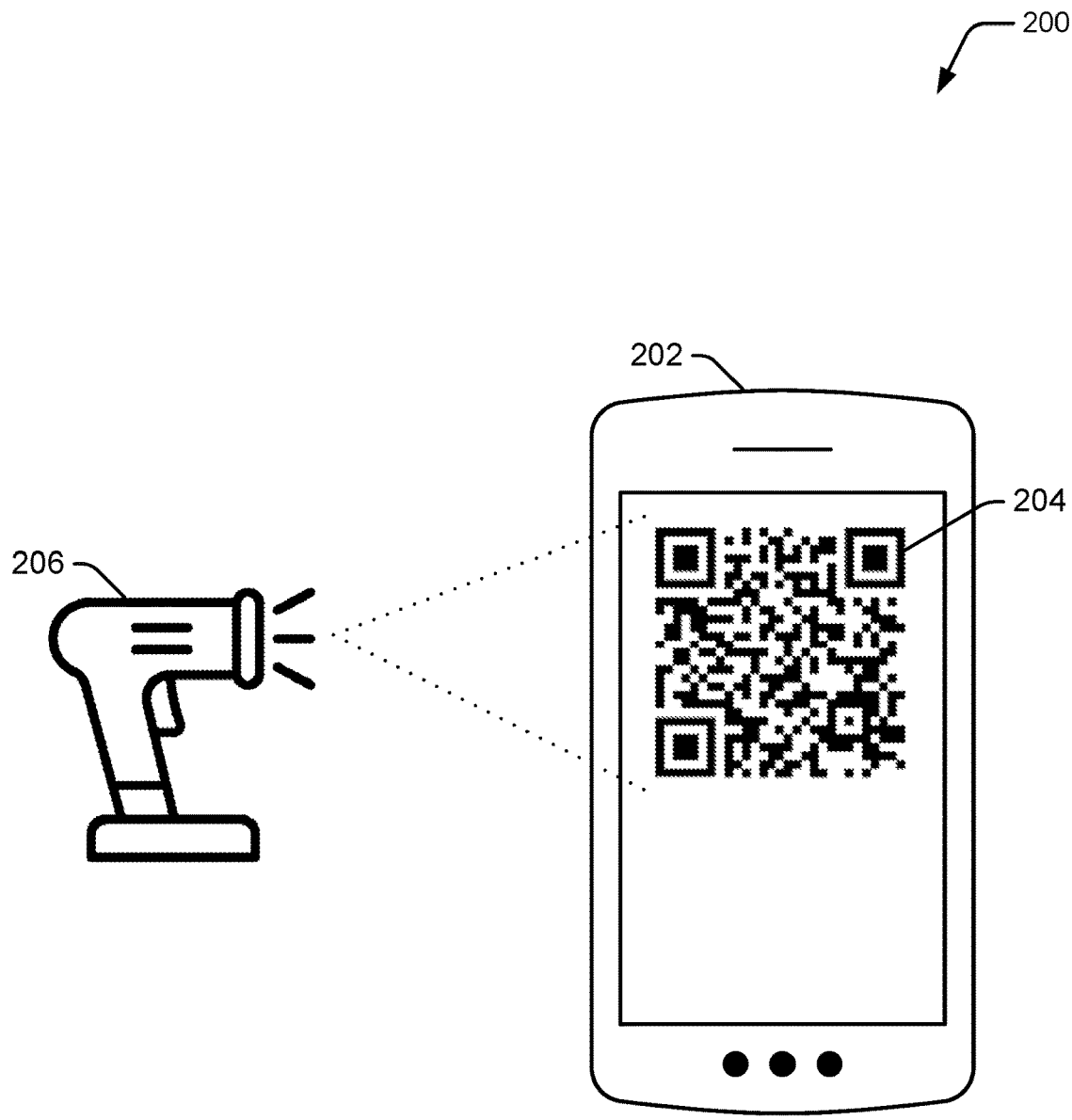
FIG. 2 illustrates an example system implementing the techniques discussed herein.

FIG. 2 illustrates an example system 200 implementing the techniques discussed herein. The system 200 includes a computing device 202, which can be a computing device 102 of FIG. 1. The computing device 202 displays a barcode 204 that is scanned by a scanning device 206.

Returning to FIG. 1, the barcode modification system 118 can be implemented in a variety of different manners. For example, the barcode modification system 118 can be implemented as multiple instructions stored on computer-readable storage media and that can be executed by the processing system 110. Additionally or alternatively, the barcode modification system 118 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The computing device 102 may also include one or more sensors 120, such as any one or more of an ambient light sensor, a proximity sensor, a touch sensor, an infrared sensor, accelerometer, gyroscope, thermal sensor, audio sensor (e.g., microphone), a depth sensor imager, and the like.

The computing device 102 also includes a storage device 122. The storage device 122 can be implemented using any of a variety of storage technologies, such as magnetic disk, optical disc, Flash or other solid state memory, and so forth. The storage device 122 can store various program instructions and data for any one or more of the operating system 112, application 116, and the barcode modification system 118.

The barcode modification system 118 determines when a barcode is being displayed on the display device 104. The barcode modification system 118 makes this determination in any of a variety of manners, such as by receiving a notification from the application 116 or operating system that generated the barcode, by the barcode modification system 118 generating the barcode itself, by analyzing the data displayed by the camera system 112, and so forth.

In one or more implementations, the barcode modification system 118 determines when a barcode is being displayed on the display device 104 by a current foreground application. Additionally or alternatively, the barcode modification system 118 determines when a barcode is being displayed on the display device 104 by any application (e.g., foreground or background application).

The barcode can encode any of a variety of different information. In one or more implementations, the barcode can encode a link or credentials for a financial transaction, such as transmitting funds from a payment application on the computing device 102 to the payment application of a merchant or another user, receiving funds from another user's payment application, and so forth. A payment application refers to an application that allows a user of a computing device to transmit financial payment (e.g., money) to another device, store funds, and so forth. A payment application may also be referred to as a digital wallet.

Additionally or alternatively, the barcode encodes information allowing the computing device 102 to connect to another device, such as another computing device or a monitor. Additionally or alternatively, the barcode encodes information allowing the computing device 102 to access or use an application 116 on the computing device 102. Additionally or alternatively, the barcode encodes information allowing a user of the computing device 102 to gain access to a particular facility or service (e.g., a boarding pass for air travel, a ticket for entry to a sporting event).

In one or more implementations, the computing device 102 includes hardware that may interfere with the display of a barcode, such as a punch hole in the display device 104 for a camera system, a speaker, a microphone, and so forth. This hardware can prevent a full barcode from being displayed, making the barcode unreadable by a scanning device.

Figure 3:
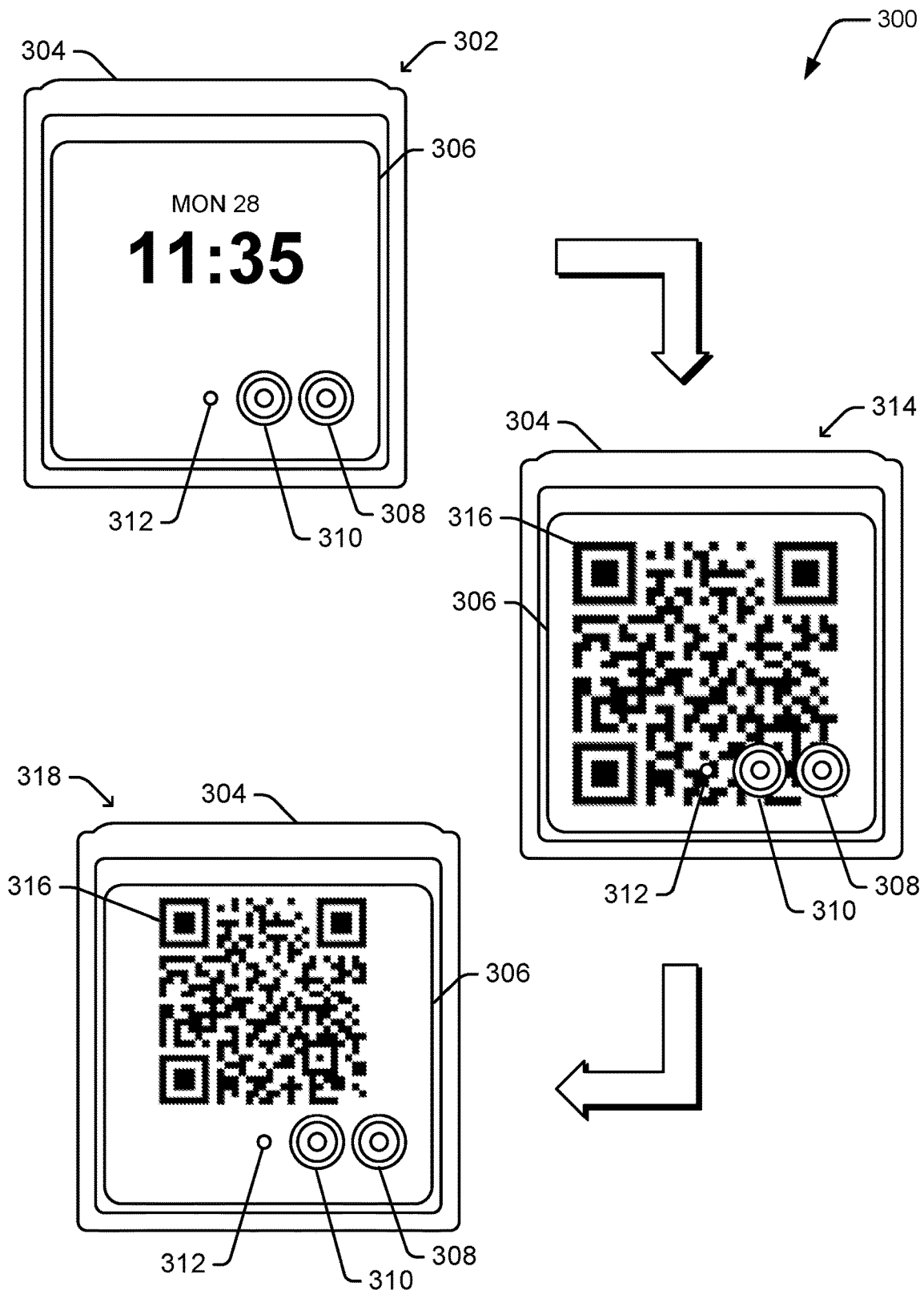
FIG. 3 illustrates an example of a barcode display by a computing device implementing the techniques discussed herein.

FIG. 3 illustrates an example 300 of a barcode display by a computing device implementing the techniques discussed herein. The example 300 illustrates, at 302, a computing device 304 (which may be a computing device 102 of FIG. 1) having a display device 306 (which may be a display device 104 of FIG. 1). The computing device 304 is an example of a flip phone having a display screen exposed on the top when the flip phone is closed. It is to be appreciated however, that the techniques discussed herein may be used with computing devices in any of a variety of form factors and are not limited to flip phones.

The display device 306 includes a camera system 308, a camera system 310, and a flash 312. Each of the camera systems 308 and 310 may be a camera system 112 of FIG. 1. The flash 312 is a light emitting device that illuminates a scene when the camera system 308 or 310 is capturing an image. The camera system 308, camera system 310, and flash 312 are punch hole devices, referring to the display device 306 including holes for the camera system 308, camera system 310, and flash 312.

At 314, the computing device 304 is illustrated as displaying a barcode 316 (a QR code) on the display device 306. As illustrated, hardware of the computing device 304, namely the camera system 308, camera system 310, and flash 312, interfere with the barcode 316 and prevent the barcode 316 from being fully displayed on the display device 306. The barcode 316 being fully displayed refers to all of the barcode being displayed rather than just a portion (less than all) of the barcode being displayed. This interference will prevent a scanning device from correctly reading or scanning the barcode 316.

The barcode modification system 118 determines that the barcode 316 will not be or is not being fully displayed on the display device 306 and modifies the display of the barcode so that the barcode is fully displayed on the display device despite the hardware of the computing device. This modification can take any of various forms, such as changing the location on the display device where the barcode is displayed (e.g., moving the barcode in one or both of the x axis and the y axis of the display device 306), reducing the resolution of the barcode (so the barcode is smaller), and so forth.

At 316, the computing device 304 is illustrated as displaying the barcode 316 (a QR code) on the display device 306 after modification. In this example, the resolution of the barcode 316 has been reduced so the barcode is smaller, and the barcode 316 is displayed towards the top of the display device 306 rather than being centered on the display device 306. Accordingly, the barcode 316 is fully displayed at 318, allowing the barcode 316 to be read or scanned by a scanning device.

Returning to FIG. 1, the barcode modification system 118 can determine that a barcode will not be or is not being fully displayed on the display device 104 in any of a variety of different manners. In one or more implementations, the barcode modification system 118 is configured with knowledge of the computing device 102 so the barcode modification system 118 knows where hardware is situated that will interfere with a barcode and prevent the barcode from being fully displayed on the display device 104.

The barcode modification system 118 can know where the barcode will be or is displayed on the display device 104 in any of various manners. In one or more implementations, the barcode modification system 118 generates the barcode and thus knows where the barcode will be or is displayed on the display device 104. Additionally or alternatively, the application 116 or operating system 114 that generates the barcode notifies the barcode modification system 118 of where the barcode is or will be displayed on the display device 104. Additionally or alternatively, the barcode modification system 118 takes a screenshot of the display device 104 displaying a barcode (or an application 116 or operating system 114 takes the screenshot and provides the screenshot to the barcode modification system 118). The barcode modification system 118 can then analyze the screenshot to readily determine whether the screenshot includes a fully displayed barcode.

Additionally or alternatively, when a barcode is displayed on the display device 104, the barcode modification system 118 determines whether the scanning device has completed scanning the barcode within a threshold amount of time. This threshold amount of time is, for example, an amount of time that a scanning device typically takes to scan a barcode. E.g., the threshold amount of time may be 200-300 milliseconds. In response to determining that the scanning device has not completed the scan within the threshold amount of time, the barcode modification system 118 modifies the display of the barcode on the display device 104. If the threshold amount of time elapses again without the scanning device having completed scanning the barcode, the barcode modification system 118 modifies the display of the barcode on the display device 104 again.

The barcode modification system 118 can determine whether the scanning device has completed scanning the barcode in any of a variety of manners. In one or more implementations, the computing device 102 receives a notification from an application associated with the scanning device that the scanning of the barcode has been completed. This notification may be, for example, a wireless signal or message to the computing device 102. The notification is provided to the barcode modification system 118, notifying the barcode modification system 118 that the scanning device has completed scanning the barcode.

Additionally or alternatively, the scanning device gives an audible or visual notification that is sensed by the computing device 102 (e.g., the microphone 106 or the camera system 112) and provided to the barcode modification system 118. For example, the scanning device may emit an audible beep, flash a light (e.g., visual light or infrared light), and so forth. This notification indicates to the barcode modification system 118 that that the scanning device has completed scanning the barcode.

Additionally or alternatively, one or more of the sensors 120 of the computing device 102 senses motion greater than a threshold amount, such as an increase in acceleration, a change in viewing angle of the camera system 112, and so forth. A rapid or significant movement of the computing device 102 can be interpreted as the user indicating that the scanning device has completed scanning the barcode. This motion indicates to the barcode modification system 118 that the scanning device has completed scanning the barcode.

The barcode modification system 118 can modify the display of the barcode on the display device 104 in any of a variety of manners. In one or more implementations, the barcode modification system 118 increases the size of the displayed barcode, such as by increasing the resolution of the barcode. In one or more implementations, the barcode modification system 118 decreases the size of the displayed barcode, such as by decreasing the resolution of the barcode.

Figure 4:
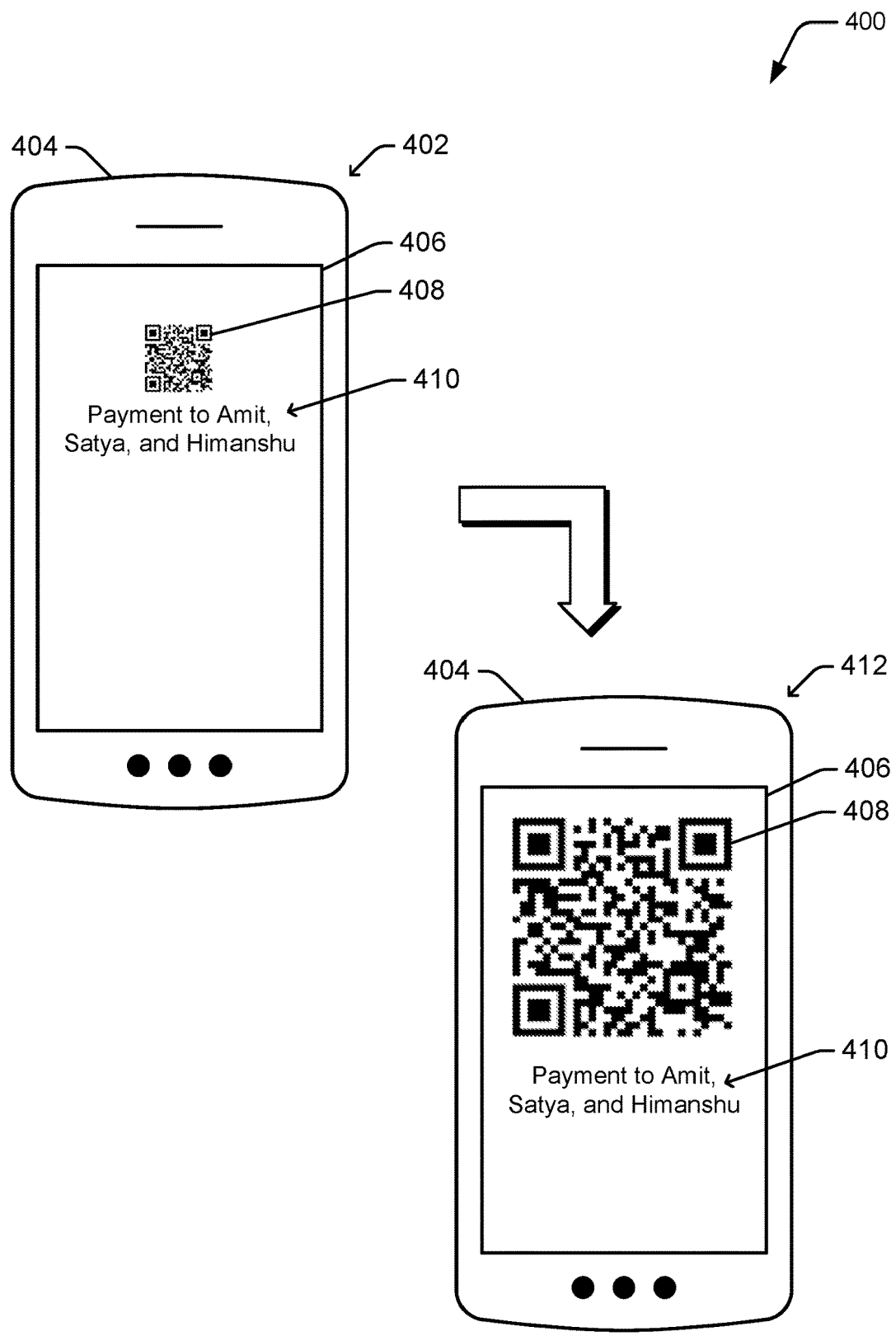
FIG. 4 illustrates an other example of a barcode display by a computing device implementing the techniques discussed herein.

FIG. 4 illustrates an example 400 of a barcode display by a computing device implementing the techniques discussed herein. The example 400 illustrates, at 402, a computing device 404 (which may be a computing device 102 of FIG. 1) having a display device 406 (which may be a display device 104 of FIG. 1). Although not illustrated in FIG. 4, it is to be appreciated that the computing device 404 optionally includes hardware that may interfere with the display of a barcode, such as a punch hole in the display device 104 for a camera system, a speaker, a microphone, and so forth analogous to the example 300 of FIG. 3.

At 402, the computing device 404 is illustrated as displaying a barcode 408 (a QR code) and a corresponding description 410 on the display device 406. Assume that the barcode modification system 118 determines that the scanning device has not completed scanning the barcode 408 within the threshold amount of time, so the barcode modification system 118 modifies the display of the barcode 408 by increasing the size of the barcode 408 (e.g., increasing the resolution of the barcode 408).

At 412, the computing device 404 is illustrated as displaying the barcode 408 (a QR code) on the display device 406 after modification. In this example, the resolution of the barcode 408 has been increased so the barcode is larger, facilitating scanning of the barcode by the scanning device.

Returning to FIG. 1, in one or more implementations the sensors 120 include a depth sensor imager (which may also be a camera systems 112) that can be used to determine the approximate distance between the scanning device and the display device 104. In one or more implementations, if the computing device 102 is a foldable device form factor (e.g., a flip phone), when the barcode is being displayed on the display device 104, a rear camera system (e.g., on a same surface of the computing device 102 as the display device 104) includes the depth sensor imager. Additionally or alternatively, if the computing device is a rollable device form factor, when the barcode is being displayed on a rear display device, a rear camera system (e.g., on a same surface of the computing device 102 as the display device 104) includes the depth sensor imager. Additionally or alternatively, in situations where the barcode is being displayed on a primary display of the computing device 102, a front camera system (e.g., on a same surface of the computing device 102 as the display device 104) includes the depth sensor imager.

In one or more implementations, the barcode modification system 118 uses the approximate distance between the scanning device and the display device 104 to determine a size (e.g., a resolution) for the displayed barcode. Generally, the larger the distance between the scanning device and the display device 104, the larger the barcode is displayed. The barcode modification system 118 can determine the size (e.g., resolution) of the barcode in various manners, such as using a predetermined formula mapping distances to resolutions, using a lookup table of distance ranges to resolutions, and so forth.

In one or more implementations, the barcode modification system 118 uses the approximate distance between the scanning device and the display device 104 to determine an initial size (e.g., resolution) for the barcode and displays the barcode at that initial size.

In one or more implementations, the barcode modification system 118 initially displays the barcode using a default size (e.g., resolution). Then, if the scanning device has not completed scanning the barcode within the threshold amount of time, the barcode modification system 118 uses the approximate distance between the scanning device and the display device 104 to determine a new size (e.g., resolution) for the barcode and displays the modified barcode with the new size.

In one or more implementations, the barcode modification system 118 determines whether to modify a barcode for display on the display device 104 in response to the display device 104 being in front of a scanning device while barcode is being displayed on the display device 104. The computing device 102 may be moved in front of the scanning device, the scanning device may be moved in front of the computing device 102, or a combination thereof.

Figure 5:
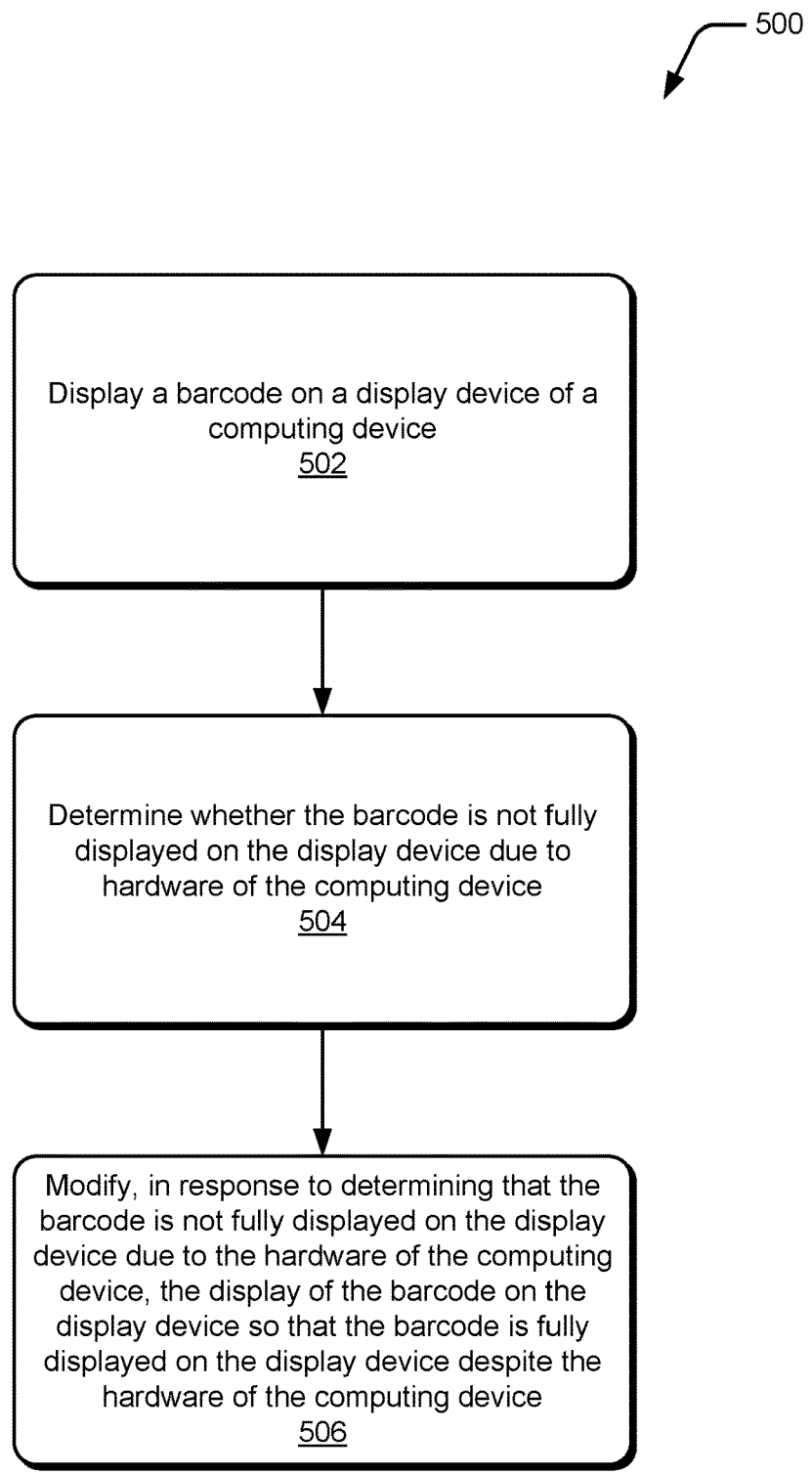
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by a barcode modification system, such as barcode modification system 118 of FIG. 1, and can be implemented in software, firmware, hardware, or combinations thereof. Process 500 is shown as a set of acts and is not limited to the order shown for performing the operations of the various acts.

In process 500, a barcode is displayed on a display device of a computing device (act 502). The barcode is, for example, a QR code.

A determination is made whether the barcode is not fully displayed on the display device due to hardware of the computing device (act 504). Various hardware may interfere with the barcode, preventing the barcode from being fully displayed on the display device, such as one or more punch holes in the display device for a camera, speaker, or microphone.

In response to determining that the barcode is not fully displayed on the display device due to the hardware of the computing device, the display of the barcode on the display device is modified so that the barcode is fully displayed on the display device despite the hardware of the computing device (act 506). The display of the barcode may be modified in various manners, such as moving the barcode (e.g., up, down, left, or right on the display device), reducing the size (e.g., resolution) of the barcode, and so forth.

Figure 6:
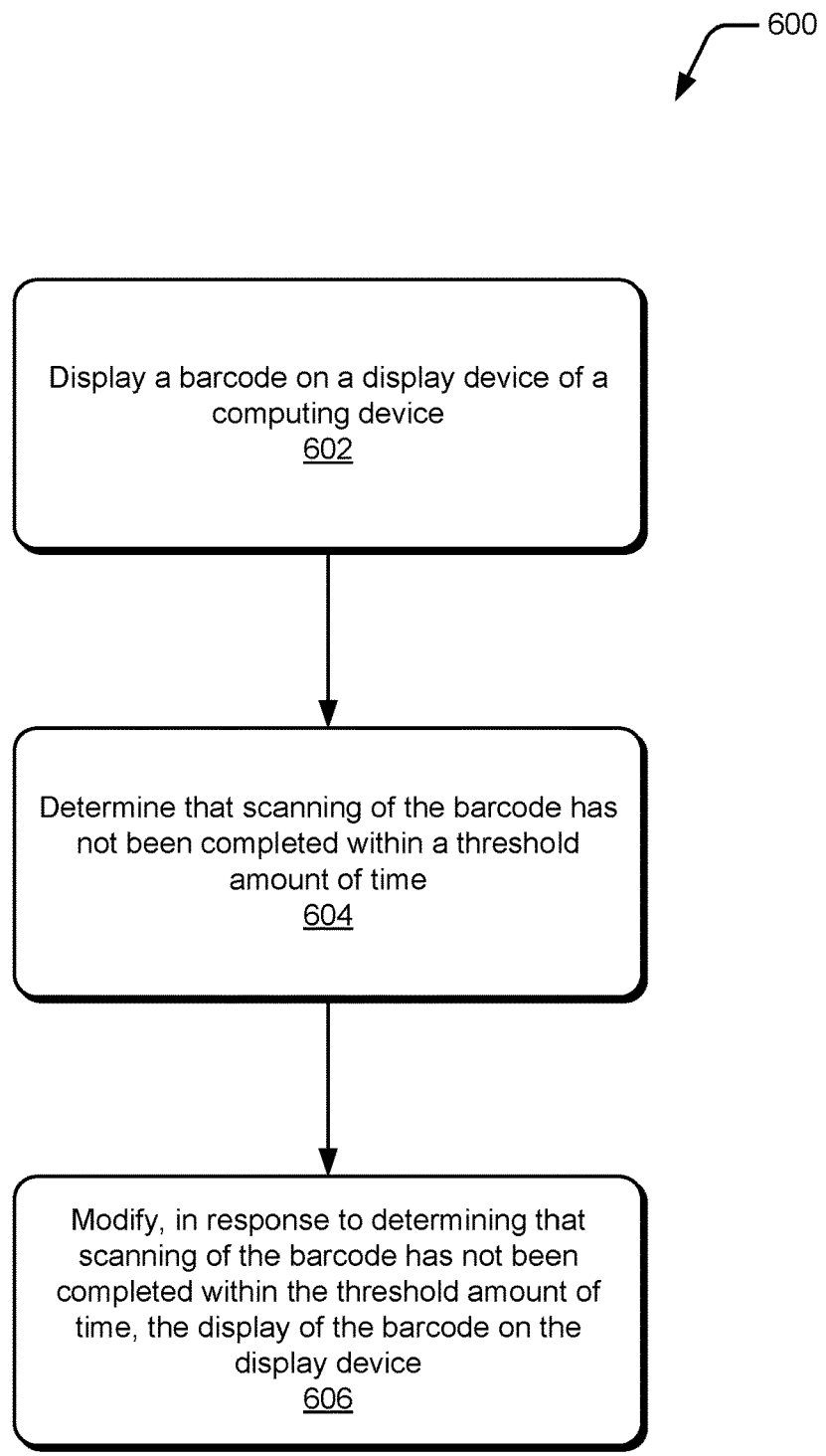
FIG. 6 illustrates another example process for implementing the techniques discussed herein in accordance with one or more embodiments.

FIG. 6 illustrates an example process 600 for implementing the techniques discussed herein in accordance with one or more embodiments. Process 600 is carried out by a barcode modification system, such as barcode modification system 118 of FIG. 1, and can be implemented in software, firmware, hardware, or combinations thereof. Process 600 is shown as a set of acts and is not limited to the order shown for performing the operations of the various acts.

In process 600, a barcode is displayed on a display device of a computing device (act 602). The barcode is, for example, a QR code.

A determination is made that scanning of the barcode has not been completed within a threshold amount of time (act 604). This threshold amount of time may be, for example, a couple hundred milliseconds.

In response to determining that scanning of the barcode has not been completed within the threshold amount of time, the display of the barcode on the display device is modified (act 606). This modification can be, for example, increasing or decreasing the size (e.g., resolution) of the barcode.

Figure 7:
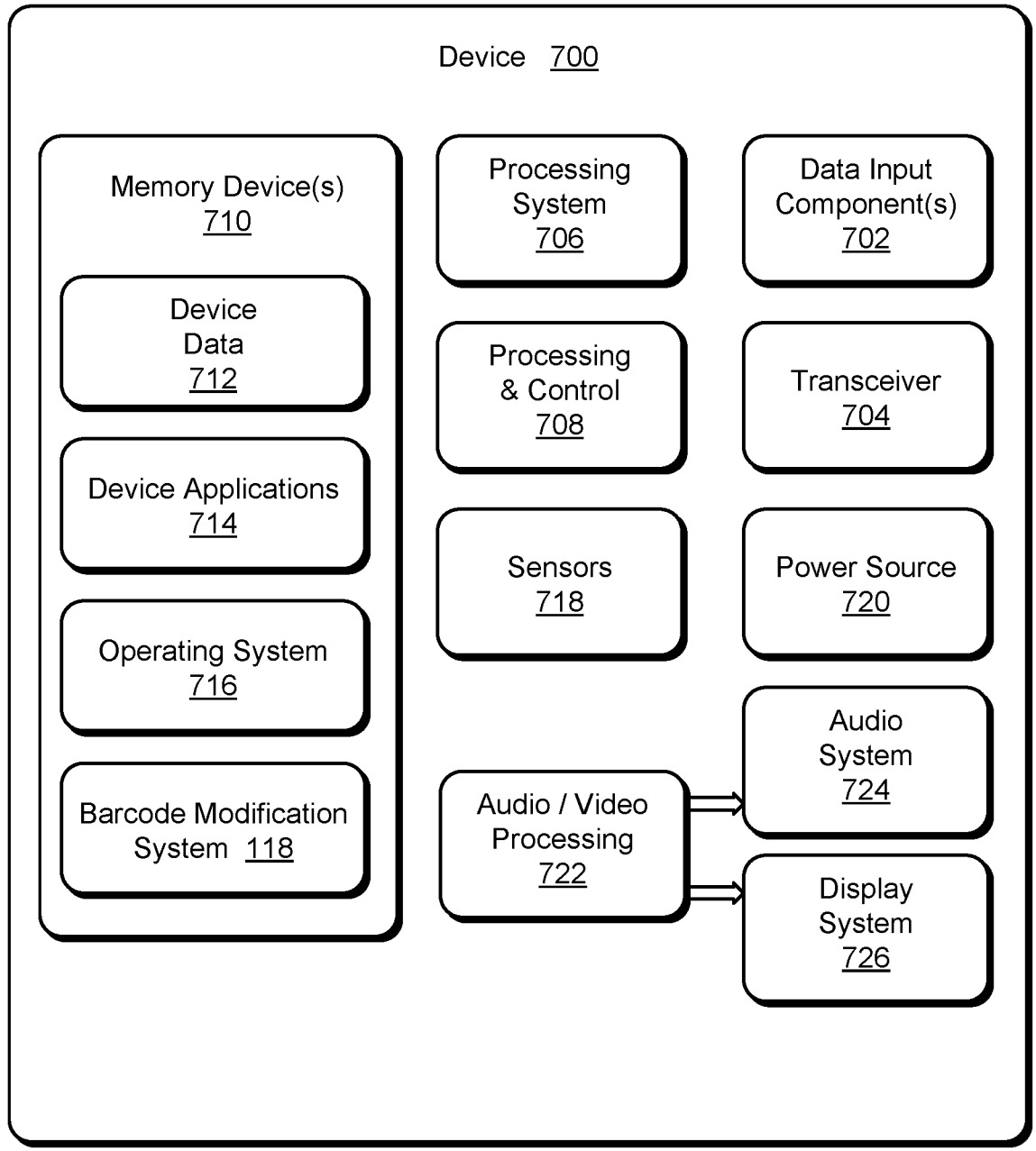
FIG. 7 illustrates various components of an example electronic device that can implement embodiments of the techniques discussed herein.

FIG. 7 illustrates various components of an example electronic device that can implement embodiments of the techniques discussed herein. The electronic device 700 can be implemented as any of the devices described with reference to the previous FIG.s, such as any type of client device, mobile phone, tablet, computing, communication, entertainment, gaming, media playback, or other type of electronic device. In one or more embodiments the electronic device 700 includes the barcode modification system 118, described above.

The electronic device 700 includes one or more data input components 702 via which any type of data, media content, or inputs can be received such as user-selectable inputs, messages, music, television content, recorded video content, and any other type of text, audio, video, or image data received from any content or data source. The data input components 702 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 702 may also include various other input components such as microphones, touch sensors, touchscreens, keyboards, and so forth.

The device 700 includes communication transceivers 704 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 700 includes a processing system 706 of one or more processors (e.g., any of microprocessors, controllers, and the like) or a processor and memory system implemented as a system-on-chip (SoC) that processes computer-executable instructions. The processing system 706 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 708. The device 700 may further include any type of a system bus or other data and command transfer system that couples the various components within the device. A system bus can include any one or combination of different bus structures and architectures, as well as control and data lines.

The device 700 also includes computer-readable storage memory devices 710 that enable one or both of data and instruction storage thereon, such as data storage devices that can be accessed by a computing device, and that provide persistent storage of data and executable instructions (e.g., software applications, programs, functions, and the like). Examples of the computer-readable storage memory devices 710 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory device 710 provides data storage mechanisms to store the device data 712, other types of information or data, and various device applications 714 (e.g., software applications). For example, an operating system 716 can be maintained as software instructions with a memory device and executed by the processing system 706 to cause the processing system 706 to perform various acts. The device applications 714 may also include a device manager, such as any form of a control application, software application, signal-processing and control module, code that is native to a particular device, a hardware abstraction layer for a particular device, and so on.

The device 700 can also include one or more device sensors 718, such as any one or more of an ambient light sensor, a proximity sensor, a touch sensor, an infrared (IR) sensor, accelerometer, gyroscope, thermal sensor, audio sensor (e.g., microphone), and the like. The device 700 can also include one or more power sources 720, such as when the device 700 is implemented as a mobile device. The power sources 720 may include a charging or power system, and can be implemented as a flexible strip battery, a rechargeable battery, a charged super-capacitor, or any other type of active or passive power source.

The device 700 additionally includes an audio or video processing system 722 that generates one or both of audio data for an audio system 724 and display data for a display system 726. In accordance with some embodiments, the audio/video processing system 722 is configured to receive call audio data from the transceiver 704 and communicate the call audio data to the audio system 724 for playback at the device 700. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for modifying a barcode display to facilitate barcode scanning have been described in language specific to features or methods, the subject of the appended claims is not necessarily limited to the specific features or methods described. Rather, the specific features and methods are disclosed as example implementations of techniques for implementing modifying a barcode display to facilitate barcode scanning. Further, various different embodiments are described, and it is to be appreciated that each described embodiment can be implemented independently or in connection with one or more other described embodiments. Additional aspects of the techniques, features, and/or methods discussed herein relate to one or more of the following:

In some aspects, the techniques described herein relate to a method including: displaying a barcode on a display device of a computing device; determining whether the barcode is not fully displayed on the display device due to hardware of the computing device; and modifying, in response to determining that the barcode is not fully displayed on the display device due to the hardware of the computing device, the display of the barcode on the display device so that the barcode is fully displayed on the display device despite the hardware of the computing device.

In some aspects, the techniques described herein relate to a method, wherein the barcode includes a quick response (QR) code.

In some aspects, the techniques described herein relate to a method, wherein modifying the barcode includes moving the barcode along an x axis or y axis of the display device.

In some aspects, the techniques described herein relate to a method, wherein the modifying the includes reducing a resolution of the barcode.

In some aspects, the techniques described herein relate to a method, further including: determining that scanning of the barcode has not been completed within a threshold amount of time; and further modifying, in response to determining that scanning of the barcode has not been completed within the threshold amount of time, the display of the barcode on the display device.

In some aspects, the techniques described herein relate to a method, wherein the further modifying includes increasing a resolution of the barcode.

In some aspects, the techniques described herein relate to a method, further including determining that scanning of the barcode has been completed in response to an audible notification received from the scanning device.

In some aspects, the techniques described herein relate to a method including: displaying a barcode on a display device of a computing device; determining that scanning of the barcode has not been completed within a threshold amount of time; and modifying, in response to determining that scanning of the barcode has not been completed within the threshold amount of time, the display of the barcode on the display device.

In some aspects, the techniques described herein relate to a method, wherein the barcode includes a quick response (QR) code.

In some aspects, the techniques described herein relate to a method, wherein the modifying includes increasing or decreasing a size of the barcode.

In some aspects, the techniques described herein relate to a method, further including: determining an approximate distance from the display device to a scanning device; and the modifying including modifying a resolution of the barcode based on the approximate distance from the display device to the scanning device.

In some aspects, the techniques described herein relate to a method, further including: determining an approximate distance from the display device to a scanning device; and setting an initial resolution for displaying the barcode based on the approximate distance from the display device to the scanning device.

In some aspects, the techniques described herein relate to a method, further including determining that scanning of the barcode has been completed in response to an audible notification received from the scanning device.

In some aspects, the techniques described herein relate to a computing device including: a processor implemented in hardware; and a computer-readable storage memory having stored thereon multiple instructions that, responsive to execution by the processor, cause the processor to perform acts including: displaying a barcode on a display device of a computing device; determining whether the barcode is not fully displayed on the display device due to hardware of the computing device; and modifying, in response to determining that the barcode is not fully displayed on the display device due to the hardware of the computing device, the display of the barcode on the display device so that the barcode is fully displayed on the display device despite the hardware of the computing device.

In some aspects, the techniques described herein relate to a computing device, wherein the barcode includes a quick response (QR) code.

In some aspects, the techniques described herein relate to a computing device, wherein modifying the barcode includes moving the barcode along an x axis or y axis of the display device.

In some aspects, the techniques described herein relate to a computing device, wherein the modifying the includes reducing a resolution of the barcode.

In some aspects, the techniques described herein relate to a computing device, the acts further including: determining that scanning of the barcode has not been completed within a threshold amount of time; and further modifying, in response to determining that scanning of the barcode has not been completed within the threshold amount of time, the display of the barcode on the display device.

In some aspects, the techniques described herein relate to a computing device, wherein the further modifying includes increasing a resolution of the barcode.

What is claimed is:

1. A method comprising:
   displaying a barcode on a display device of a computing device;
   determining whether the barcode is not fully displayed on the display device due to at least one of a camera, a speaker, or a microphone of the computing device; and
   modifying, in response to determining that the barcode is not fully displayed on the display device due to at least one of the camera, the speaker, or the microphone of the computing device, the display of the barcode on the display device so that the barcode is fully displayed on the display device despite the at least one of the camera, the speaker, or the microphone of the computing device.

2. The method of claim 1, wherein the barcode comprises a quick response (QR) code.

3. The method of claim 1, wherein modifying the barcode comprises moving the barcode along an x axis or y axis of the display device.

4. The method of claim 1, wherein the modifying the display of the barcode comprises reducing a resolution of the barcode.

5. The method of claim 1, further comprising:
   determining that scanning of the barcode has not been completed within a threshold amount of time; and
   further modifying, in response to determining that scanning of the barcode has not been completed within the threshold amount of time, the display of the barcode on the display device.

6. The method of claim 5, wherein the further modifying comprises increasing a resolution of the barcode.

7. The method of claim 5, further comprising determining that scanning of the barcode has been completed in response to an audible notification received from a scanning device.

8. A method comprising:
   displaying a barcode on a display device of a computing device;
   determining that scanning of the barcode has not been completed within a threshold amount of time;
   determining an approximate distance from the display device to a scanning device; and modifying, in response to determining that scanning of the barcode has not been completed within the threshold amount of time and based on the approximate distance from the display device to the scanning device, the display of the barcode on the display device.

9. The method of claim 8, wherein the barcode comprises a quick response (QR) code.

10. The method of claim 8, wherein the modifying comprises increasing or decreasing a size of the barcode.

11. The method of claim 8, further comprising:
setting an initial resolution for displaying the barcode based on the approximate distance from the display device to the scanning device.

12. The method of claim 8, further comprising determining that scanning of the barcode has been completed in response to an audible notification received from a scanning device.

13. The method of claim 8, further comprising determining a size or resolution of the barcode using at least one of a predetermined formula mapping distances to sizes or resolutions, or using a lookup table of distances to sizes or resolutions.

14. A computing device comprising:
a display device;
at least one memory; and
at least one processor coupled with the at least one memory and configured to cause the computing device to:
display a barcode on the display device;
determine whether the barcode is not fully displayed on the display device due to at least one punch hole in the display device; and
modify, in response to determining that the barcode is not fully displayed on the display device due to the at least one punch hole in the display device, the display of the barcode on the display device so that the barcode is fully displayed on the display device despite the at least one punch hole in the display device.

15. The computing device of claim 14, wherein the barcode comprises a quick response (QR) code.

16. The computing device of claim 14, wherein to modify the barcode comprises to move the barcode along an x axis or y axis of the display device.

17. The computing device of claim 14, wherein to modify the display of the barcode comprises to reduce a resolution of the barcode.

18. The computing device of claim 14, wherein the at least one processor is further configured to cause the computing device to:
determine that scanning of the barcode has not been completed within a threshold amount of time; and
further modify, in response to determining that scanning of the barcode has not been completed within the threshold amount of time, the display of the barcode on the display device.

19. The computing device of claim 18, wherein to further modify comprises to increase a resolution of the barcode.

20. The computing device of claim 14, wherein the at least one punch hole is associated with at least one of a camera, a speaker, or a microphone of the computing device.

* * * * *